UNITED STATES PATENT OFFICE.

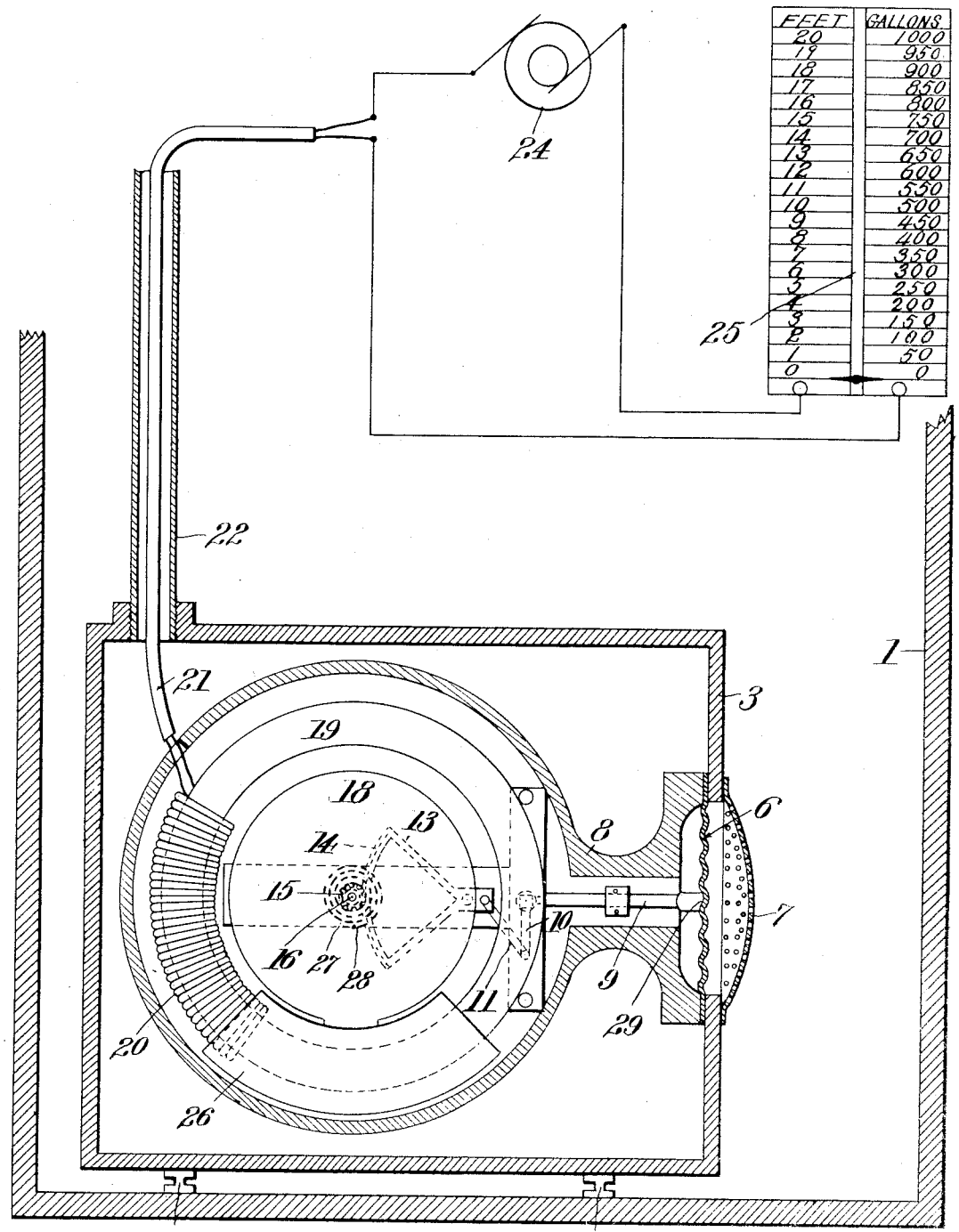

FREDERICK J. TROLL, OF BALTIMORE, MARYLAND, ASSIGNOR TO THE LOADOMETER COMPANY, OF BALTIMORE, MARYLAND, A CORPORATION OF DELAWARE.

ELECTRICAL FLUID-PRESSURE INDICATOR.

1,171,480.   Specification of Letters Patent.   Patented Feb. 15, 1916.

Application filed July 14, 1910.   Serial No. 571,999.

*To all whom it may concern:*

Be it known that I, FREDERICK J. TROLL, a citizen of the United States, residing at Baltimore, in the county of Baltimore and State of Maryland, have invented new and useful Improvements in Electrical Fluid-Pressure Indicators, of which the following is a specification.

This invention relates to electrical fluid pressure indicators for indicating at some distant point, the pressure or quantity of liquids, or fluids, such as water, air, gas, steam, etc.

One object of my invention is to provide a fluid pressure-actuated device which may be located either inside or outside of the receptacle containing the liquid or fluid whose pressure or quantity is to be measured. Thus the fluid pressure-actuated device may be in the water-tanks or compartments of floating dry-docks, or in the ballast tanks of ships or in reservoirs, etc., without being affected by corrosion or by the changes in temperature, the indications corresponding to the varying amounts of liquid being registered by a suitable instrument located in the engine room or other convenient place.

Another object of my invention is to overcome the difficulties which usually attend electrical indicating devices and systems which employ variable resistances or other devices requiring movable or sliding contacts which are liable to corrode or change in resistance due to other causes. Furthermore by my method disclosed herein, I am enabled to dispense with the use of variable resistances to control the circuit indications which are liable to introduce uncertainties owing to changes brought about by variations in temperature or other causes. In my present invention I utilize the property of reactance in circuits carrying alternating or pulsating currents, as the controlling factor and am thereby enabled to operate the system upon the closed circuit principle.

With the above-mentioned objects and ends in view, my invention will be understood from the following description in connection with the illustrative diagram given in the accompanying drawings to show one embodiment thereof.

In the drawings, 1 indicates a tank or reservoir in which it is desired to ascertain, at any instant, the depth and volume of the contained liquid. These may be ascertained by the corresponding pressure due to the different depths of liquid. I have indicated a standard diaphragm gage for one form of fluid pressure-actuated device in which the operating parts are contained in a hermetically sealed casing or receptacle 3, having supports 4, resting upon the bottom of the tank.

The pressure of the liquid is transmitted to the operating parts of the device through a flexible acid-proof diaphragm 6, covering an opening in the wall of the receptacle 3 and which may be protected by a screen 7, the diaphragm being clamped at its periphery between the wall and the base of the frame 8. The vibrations of the diaphragm may be transmitted by means of a shaft 9 and a system of multiplying levers 10, 11, to the sector 13, having a rack 14 engaging with a pinion 15, to rotate the shaft 16 upon which is mounted a copper or aluminum disk 18. The movements of the disk, therefore, correspond with the vibrations of the diaphragm 6 and hence with variations of pressure due to different levels of the liquid in the tank 1.

For the purpose of indicating the movements of the diaphragm upon a suitable instrument located at a distance in some convenient place, I connect a reactance device in circuit with said instrument and vary the self-induction of said device in accordance with the movements of the disk 18. The reactance device comprises a laminated soft iron core 19, secured to the frame 8, and having wound thereon a coil of insulated wire 20, the terminals of which are connected with a cable 21 which passes up through an insulating tube or duct 22 and is connected in circuit with a suitable source of varying currents, such as an alternating current generator 24, and with an indicating instrument 25, such as a voltmeter or milli-ammeter. The dial or scale of this instrument may be graduated to indicate the depth of the liquid in feet and the volume in gallons. The reactance of the coil 20 is the controlling factor or constant of the circuit, the value of which controls the impedance of the circuit and consequently the amount of current flowing at any instant.

In order that the self-induction or reactance of the coil 20 shall change in accordance with the movements of the disk 18 and accordingly, in proportion to the variations of liquid pressure upon the diaphragm 6, I secure a closed metal band or sheath 26, preferably of copper or aluminum to the disk, which is adapted to envelop more or less of the coil 20 in accordance with the rotation of the disk.

It is known by engineers and others skilled in the art, that the currents induced in the sheath by the magnetic flux generated by the currents flowing in the coil 20, oppose and nullify the self-induction of the adjacent portion of the coil. The reactance or impedance of the coil is, therefore, reduced in proportion to the amount of the coil enveloped by the sheath, and this, in turn, depends upon the rotation of the disk 18, which is under the control of the diaphragm 6.

As previously explained, the impedance of the electrical circuit, and consequently the current flowing therein, is controlled by the self-induction or reactance of the coil 20. In as much as the indications of the milli-ammeter 25, depend upon the current flowing in the circuit, it will be evident that the variations or changes therein will be in proportion to the movements of the diaphragm 6 and will indicate the variations in pressure or the depth of the liquid.

The character 27 indicates a spring adapted to bring parts 18 and 26 back to their normal positions when there is no pressure on the diaphragm. One end of the coil spring 27 is secured to the shaft 16 and the other end is secured at 28 to the part 8.

The apparatus above described will serve to illustrate one embodiment of my invention, but I wish it to be understood that there are other devices which may be employed for the same purpose.

What is claimed is:

1. In a fluid pressure indicating device, a hermetically sealed receptacle adapted to be immersed in a body of fluid and having an opening therein, a flexible diaphragm closing said opening and exposed to the surrounding fluid, a closed circuit carrying an alternating current, a reactance device located in the receptacle and including a rotatable disk, and means operated by the movements of the diaphragm due to the varying pressure of the fluid thereon for rotating said disk and thereby varying the self-induction of the reactance device including a connection between the diaphragm and the disk.

2. A fluid pressure indicating device comprising a hermetically sealed receptacle adapted to be immersed in a body of fluid, and having an opening in one of its walls, a flexible diaphragm closing said opening and exposed to the surrounding fluid, a closed circuit carrying an alternating or pulsating current, a self induction coil in said circuit and located in the receptacle, a rotary disk adjacent to said coil and means operated by the movements of the diaphragm due to the varying pressure of the fluid thereon, for varying the self induction of the coil, comprising a shaft and operable by the diaphragm, and a metallic sheath on the disk adapted to more or less envelop the coil.

3. A fluid pressure indicating device comprising a hermetically sealed receptacle adapted to be immersed in a body of fluid, and having an opening in one of its walls, a flexible acid proof diaphragm closing said opening and exposed to the surrounding fluid, a self induction coil in the receptacle, a rotary disk adjacent to the coil, a metallic sheath carried by the disk and adapted to more or less envelop the coil, a shaft on which the disk is mounted, and connections between the diaphragm and shaft whereby the shaft is rotated by the movement of the diaphragm due to the varying pressure of the liquid.

In testimony whereof I have hereunto set my hand in presence of two subscribing witnesses.

FREDERICK J. TROLL.

Witnesses:
 MILTON E. BOSS,
 WALTER M. TROLL.